(12) United States Patent
Ismert

(10) Patent No.: US 10,962,123 B2
(45) Date of Patent: Mar. 30, 2021

(54) PUSH-FIT SPIGOT

(71) Applicant: Sioux Chief Mfg. Co., Inc., Kansas City, MO (US)

(72) Inventor: Brian E. Ismert, Lone Jack, MO (US)

(73) Assignee: Sioux Chief Mfg. Co., Inc., Kansas City, MO (US)

(*) Notice: Subject to any disclaimer, the term of this patent is extended or adjusted under 35 U.S.C. 154(b) by 171 days.

(21) Appl. No.: 16/392,298

(22) Filed: Apr. 23, 2019

(65) Prior Publication Data

US 2019/0323613 A1 Oct. 24, 2019

Related U.S. Application Data

(60) Provisional application No. 62/661,465, filed on Apr. 23, 2018.

(51) Int. Cl.
| | |
|---|---|
| *F16K 3/30* | (2006.01) |
| *F16K 5/02* | (2006.01) |
| *F16K 5/06* | (2006.01) |
| *F16L 21/03* | (2006.01) |
| *F16L 21/08* | (2006.01) |

(52) U.S. Cl.
CPC ............ *F16K 3/30* (2013.01); *F16K 5/0292* (2013.01); *F16L 21/03* (2013.01); *F16L 21/08* (2013.01); *F16K 5/0626* (2013.01); *Y10T 137/6014* (2015.04); *Y10T 137/6154* (2015.04); *Y10T 137/6977* (2015.04); *Y10T 137/9464* (2015.04)

(58) Field of Classification Search
CPC ......... Y10T 137/6014; Y10T 137/6031; Y10T 137/6154; Y10T 137/6977; Y10T 137/698; Y10T 137/9464; F16K 5/0626; F16K 5/0292; F16K 3/30; F16K 5/0492; F16L 21/03; F16L 21/08
See application file for complete search history.

(56) References Cited

U.S. PATENT DOCUMENTS

| | | | | |
|---|---|---|---|---|
| 1,377,597 A | * | 5/1921 | Mueller | ............... F16K 27/12 |
| | | | | 285/46 |
| 1,537,194 A | * | 5/1925 | Rogers | ................ F16K 27/12 |
| | | | | 137/359 |
| 1,562,982 A | * | 11/1925 | Muend | ................ F16K 27/12 |
| | | | | 285/18 |
| 2,172,073 A | * | 9/1939 | Smith | ................... F16K 1/42 |
| | | | | 251/360 |

(Continued)

*Primary Examiner* — Jessica Cahill
(74) *Attorney, Agent, or Firm* — Erickson Kernell IP, LLC; Kent R. Erickson

(57) ABSTRACT

A push-fit spigot. The spigot includes a push-fit coupling member removably disposed within an internal passage of a body of the spigot. The coupling member enables simple push-fit installation of the spigot on a stub-out in a structure. The coupling member is retained within the internal passage of the spigot by a removable fastener. A removal plate is installed on the stub-out prior to making insertion of the stub-out into the coupling member. Removal of the spigot from an installation on the stub-out is simply performed by removing the fastener between the coupling member and the body to enable removal of the body. The removal plate is then useable to depress a release collar in the coupling member to disengage the push-fit mechanism therein from the stub-out.

20 Claims, 7 Drawing Sheets

(56) References Cited

U.S. PATENT DOCUMENTS

| | | | |
|---|---|---|---|
| 3,067,436 A * | 12/1962 | Freibott | E03C 1/042 |
| | | | 4/675 |
| 4,630,848 A | 12/1986 | Twist et al. | |
| 4,911,406 A | 3/1990 | Attwood | |
| 5,236,229 A * | 8/1993 | Gonzalez | F16L 5/10 |
| | | | 137/359 |
| 5,487,572 A | 1/1996 | Combot-Courrau et al. | |
| 5,865,211 A * | 2/1999 | Thomas | E03C 1/0401 |
| | | | 137/315.13 |
| 6,301,727 B1 * | 10/2001 | Bertrand | E03C 1/042 |
| | | | 137/359 |
| 6,378,912 B1 | 4/2002 | Condon et al. | |
| 7,111,875 B2 * | 9/2006 | Ball | E03C 1/042 |
| | | | 137/360 |
| 7,341,286 B2 | 3/2008 | Andre | |
| 7,942,161 B2 * | 5/2011 | Crompton | E03C 1/042 |
| | | | 137/359 |
| 8,151,821 B2 * | 4/2012 | Ball | F16L 3/00 |
| | | | 137/359 |
| 8,214,941 B2 * | 7/2012 | Furseth | E03C 1/042 |
| | | | 4/678 |
| 8,424,559 B2 * | 4/2013 | Huang | E03C 1/0403 |
| | | | 137/360 |
| 8,464,369 B2 | 6/2013 | Furseth | |
| 8,613,294 B2 * | 12/2013 | Yeh | E03C 1/0403 |
| | | | 137/801 |
| 9,664,318 B2 * | 5/2017 | Crompton | F16L 5/00 |
| 9,687,860 B2 | 6/2017 | Huffington et al. | |
| 9,879,810 B2 * | 1/2018 | Crompton | F16L 58/18 |
| 10,352,025 B2 * | 7/2019 | Culmer | E03C 1/0409 |
| 10,385,554 B2 * | 8/2019 | O'Neill | E03C 1/021 |
| 2010/0066074 A1 * | 3/2010 | Crompton | F16L 19/08 |
| | | | 285/16 |
| 2010/0066075 A1 * | 3/2010 | Crompton | F16L 19/08 |
| | | | 285/16 |
| 2010/0171308 A1 | 7/2010 | Sanzone et al. | |
| 2010/0229961 A1 * | 9/2010 | Ball | E03B 7/10 |
| | | | 137/299 |

\* cited by examiner

PUSH-FIT SPIGOT

CROSS-REFERENCE TO RELATED APPLICATIONS

This application claims the benefit of U.S. Provisional Patent Application No. 62/661,465 filed Apr. 23, 2018, the disclosure of which is hereby incorporated herein in its entirety by reference.

BACKGROUND

A variety of ways are available for installing a spigot or faucet on a stub-out in a structure. These include ways for installing the spigot on a variety of forms of the stub-out including for example a copper stub-out as well as a stub-out formed from a PEX (cross-linked polyethylene), PVC (polyvinyl chloride), or CPVC (chlorinated polyvinyl chloride), among others. Such installations suffer from difficulties involved in insuring a proper liquid-tight seal while also providing a clean, finished appearance.

Difficulties in installation arise due to limited space available for use and operation of tools required to provide connections between the spigot and the stub-out and the stub-out to water supply tubing. Similarly, the length of the stub-out required to enable installation must be adjusted and sized to provide an acceptable finish of the spigot, such as by threading a selected pipe nipple of a required length between the spigot and a supply fitting disposed within the structure. These difficulties and others increase installation time and can lead to leaks, kinking, and breakage among other problems.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a spigot, sillcock, or faucet that is configured for push-fit connection to a stub-out or other source pipe or tube.

The spigot includes a valve body, a coupling member, and a removal plate. The valve body is configured to provide a desired valve means such as a ball valve and a fluid outlet such as a threaded hose coupling that may be useable in a residential water application. The valve body also includes an inlet passage in which the coupling member is coaxially disposed with a liquid-tight fit. The coupling member is configured to receive the end of the stub-out and to couple thereto in a push-fit manner as known in the art. The removal plate comprises a generally planar member with a central aperture sized to receive the stub-out in a slidable but snug-fitting manner. The removal plate may also include a plurality of radially extending slots or depressions on an axial face thereof.

The spigot is simply installed by placing the removal plate on the stub-out and then inserting the stub-out into the coupling member to engage the push-fit coupling therein. The spigot may then be coupled to a structure from which the stub-out extends using fasteners disposed through a mounting flange on the valve body and into the structure.

Removal of the spigot is completed by first decoupling the mounting flange from the structure. The valve body is disengaged from the coupling member by removing a retaining screw and axially sliding the valve body away from the structure to withdraw the coupling member from within the interior of the valve body. The removal plate is employed to depress a release ring in the coupling member to disengage the push-fit connection by, for example inserting an elongate prying device, such as a flat-head screwdriver between the removal plate and the structure and preferably into the slots in the removal plate. Disengagement of the push-fit connection enables the coupling member and the removal plate to be pulled free from the stub-out.

DESCRIPTION OF THE DRAWINGS

Illustrative embodiments are described in detail below with reference to the attached drawing figures, and wherein.

DETAILED DESCRIPTION

Figure 1:
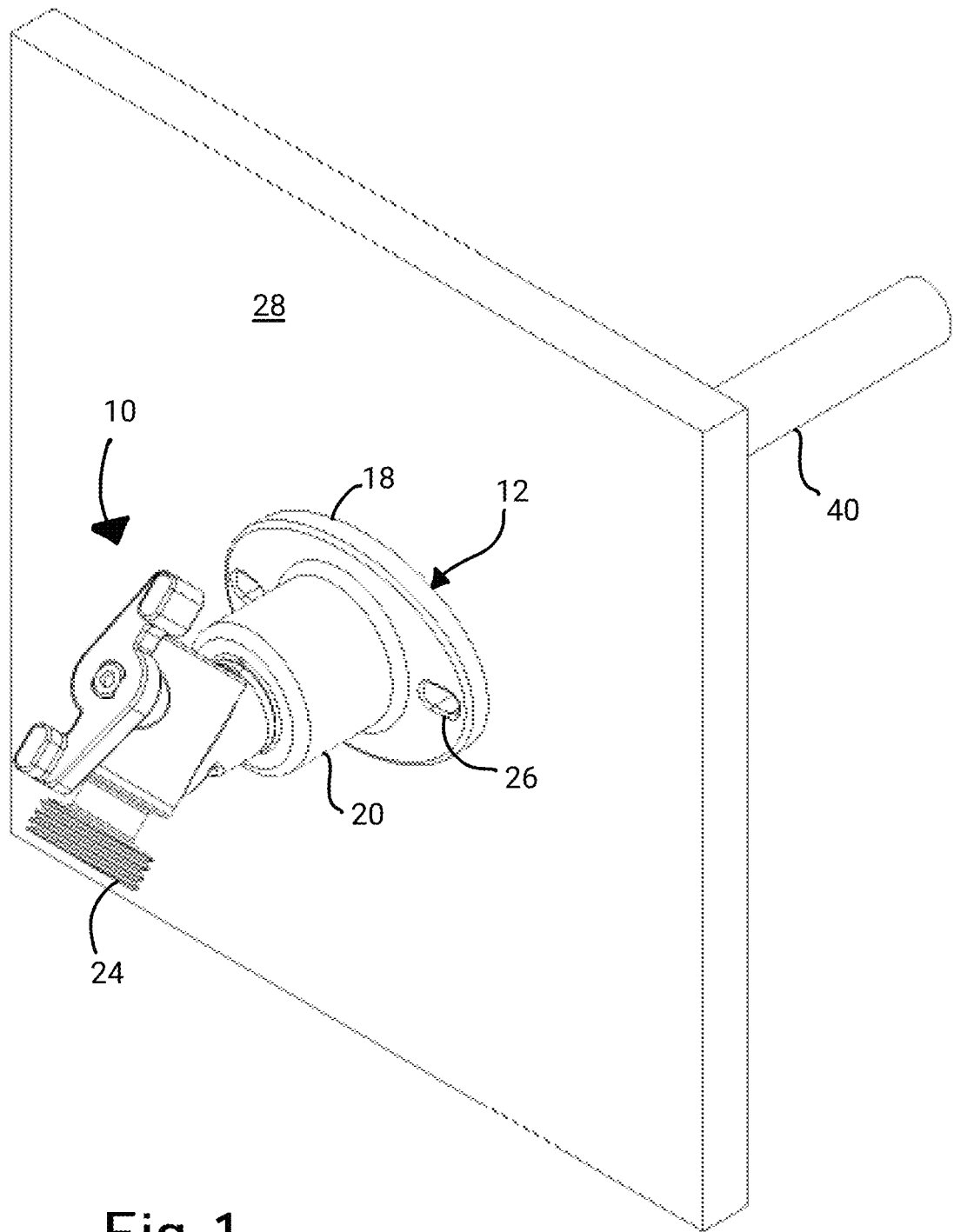
FIG. 1 is a perspective view of a push-fit spigot installation depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

With reference now to FIGS. 1-6, a push-fit spigot 10 is described in accordance with an exemplary embodiment. The spigot 10 is shown and described herein configured as a quarter-turn, ball-valve spigot with a threaded outlet connection for use in exterior residential or commercial structures, however it is to be understood the embodiments of the spigot 10 are not so limited. The spigot 10 may also be referred to as a faucet, tap, sillcock, hydrant, or bib, among other names and may be configured for a variety of interior or exterior applications that provide a variety of valve types, outlet-connections, and actuator, handle, or operational lever configurations.

The spigot 10 comprises a valve body 12, a coupling member 14, and a removal plate 16. The valve body 12 includes a mounting flange 18, an inlet portion 20, a valve 22, an actuator 23 or handle, and an outlet 24. The mounting flange 18 comprises an enlarged section having one or more apertures 26 configured to receive a fastener 27 for coupling to a wall 28 of a structure 30 on which the spigot 10 is to be installed. Hereinafter, the wall or structure on which the spigot 10 is installed is referred to generally as the wall 28.

The inlet portion 20 extends from the mounting flange 18 to the valve 22 and provides a cylindrical internal passage 32 having a flange portion 34, a receiver portion 36, and a neck portion 38. The flange portion 34 has a radial dimension that is at least just larger than an outer radial dimension of the removal plate 16 and an axial depth sufficient to at least partially receive the removal plate 16 therein.

The receiver portion 36 has a radial dimension that is smaller than that of the flange portion 34 but just larger than a radial dimension of the coupling member 14 such that the coupling member 14 is axially receivable within the internal passage 32. The receiver portion 36 has an axial length that is equal to or greater than an axial length of the coupling member 14.

The neck portion 38 has a radial dimension that is smaller than the radial dimension of the receiver portion 36 but just larger than a radial dimension of a stub-out 40 on which the spigot 10 is to be installed. The junction between the receiver portion 36 and the neck portion 38 thus forms a shoulder 42 against which the coupling member 14 may be abutted when installed in the internal passage 32, as described more fully below. The neck portion 38 extends to the valve 22 to provide fluid communication between the stub-out 40 and the valve 22.

As discussed previously, the valve 22 depicted in FIGS. 1-10 comprises a ball valve but may be provided in any desired valve configuration. The valve 22 is operable to selectively enable fluid communication of a fluid received from the stub-out 40 and through the neck portion 38 to the outlet 24. The outlet 24 includes a threaded exterior adapted for coupling to a common garden hose but may be provided with any desired coupling configuration or ornamentation.

The coupling member 14 comprises a compression or quick-connect fitting which is referred to herein as a push-fit fitting but may also be known in the art as a push-to-connect, push-in, push-to-pull, or instant fitting, among other names. The configuration and operation of push-fit fittings are generally well known in the art and are thus only described at a high level herein. Push-fit fittings include a bore 44 that is sized to receive an end of the stub-out 40. One or more sealing members or O-rings 46 are provided within the bore 44 to be compressed against an outer wall of the stub-out 40 when inserted into the bore 44 and thereby provide a liquid-tight seal between the coupling member 14 and the stub-out 40.

A toothed grip-ring 48 is also provided within the bore 44 to engage the exterior surface of the stub-out 40 and resist withdrawal of the stub-out 40 from the bore 44. A release collar 50 is disposed within the bore 44 between the exterior surface of the stub-out 40 and an interior wall of the bore 44 and protrudes at least partially from a first end 51 of the bore 44. The release collar 50 is slidably, axially depressible into the bore 44 to disengage the grip-ring 48 from the exterior surface of the stub-out 40 and thereby enable withdrawal of the stub-out 40 from the coupling member 14.

Although the push-fit connection portion of the coupling member 14 may be configured in ways known in the art, the coupling member 14 includes novel features not found in prior push-fit fittings. The coupling member 14 includes an annular trough 52 formed in an exterior surface thereof. The annular trough is sized and positioned to at least partially receive a removable fastener 54 inserted through the valve body 12 as described more fully below. The coupling member 14 also includes an annular channel 56 with a sealing member or O-ring 58 disposed therein on the exterior surface thereof and located near a second end 59 thereof. The annular channel 56 and O-ring 58 are sized and positioned to at least partially compress the O-ring 58 between the coupling member 14 and an interior surface of the internal passage 32 when the coupling member 14 is installed therein and thus to provide a liquid-tight seal therebetween.

The second end 59 of the coupling member forms an abutment face 61 that is adapted to abut the shoulder 42 in the internal passage 32 of the valve body 12. In one embodiment, a sealing member, such as the O-ring 58 or a gasket, or a sealant, such as a silicon sealant, or the like may be disposed on or between the abutment face 61 and the shoulder 42 to form a liquid-tight seal therebetween.

The removal plate 16 comprises a generally planar, ring-shaped member with a centrally located aperture 60. The aperture 60 has a radial dimension that is nearly equal to that of the outer radial dimension of the stub-out 40, i.e. just smaller, just larger, or equal to a radial dimension of the stub-out 40 such that the stub-out 40 can be received within the aperture 60 in a snug-fitting or tight, but slidable manner. The outer radial dimension of the removal plate 16 is smaller than the radial dimension of the flange portion 34 of the internal passage 32 such that removal plate 16 can be at least partially received within the flange portion 34. The removal plate 16 may be configured to resist travel of liquids along the stub-out 40 and into the wall 28. For example, the removal plate 16 may be configured to include features like those described in U.S. Pat. No. 7,197,777 to Ismert et al. which is incorporated herein by reference to provide description of configurations and features associated with prevention of fluid movement along a tube or pipe. Such features may include a conical or convex front face or tapered edges among others.

Figure 2:
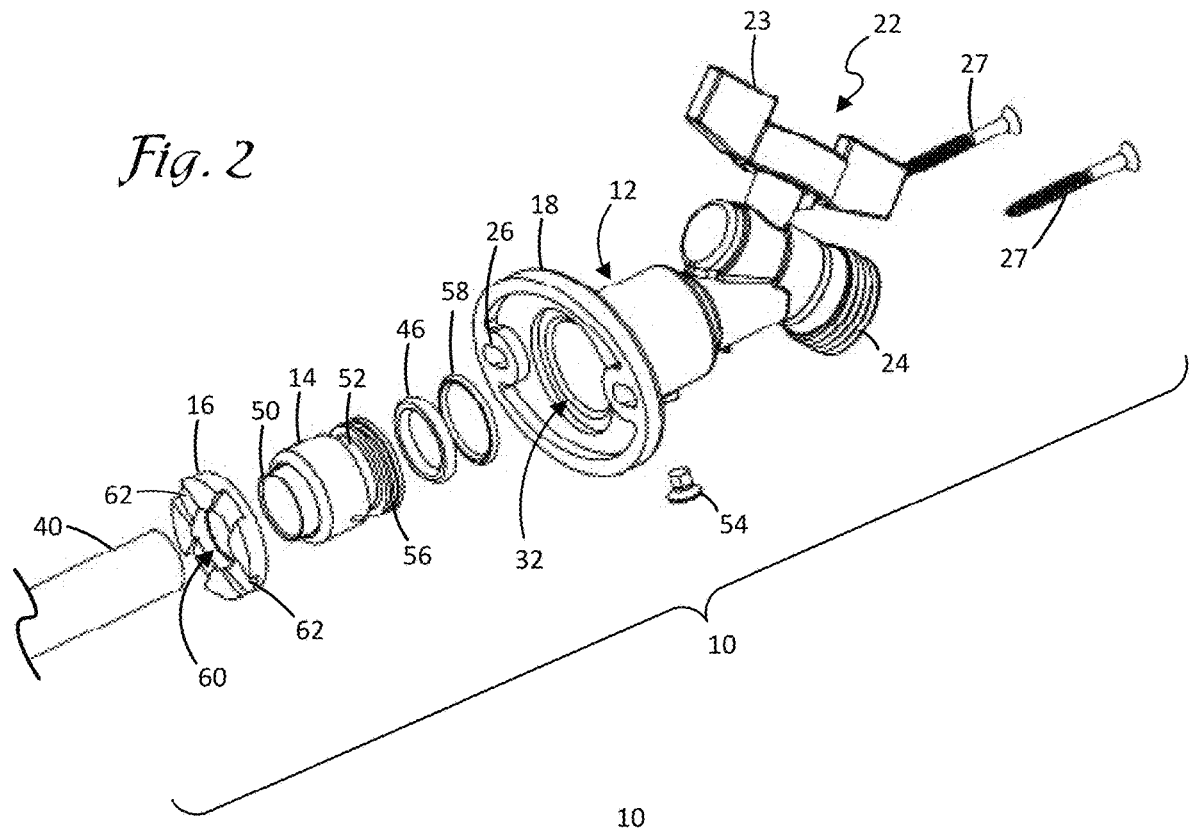
FIG. 2 is an exploded perspective view of the spigot of FIG. 1.
Figure 3:
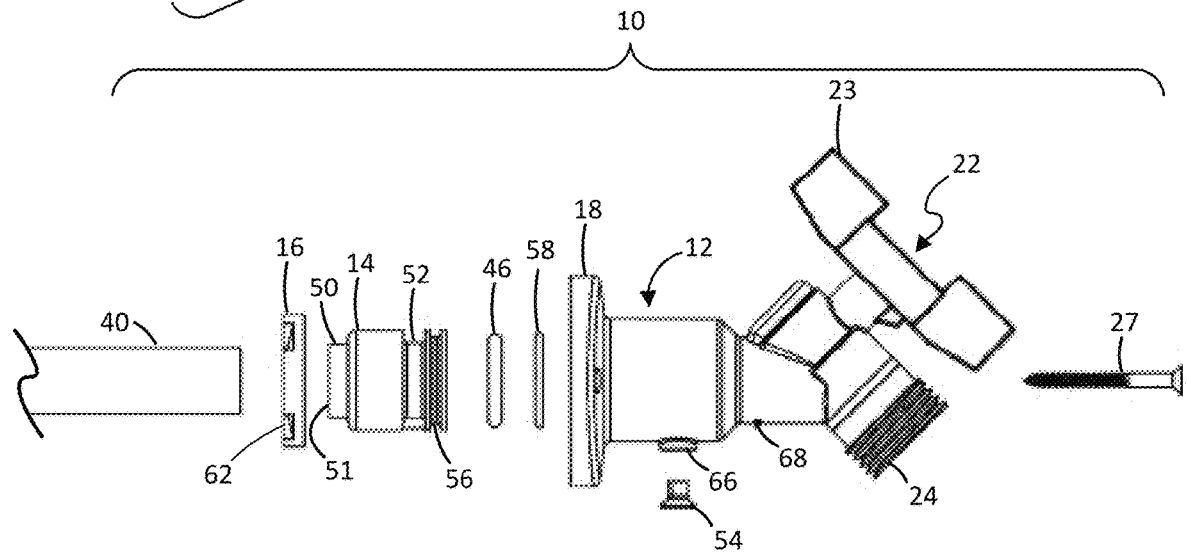
FIG. 3 is an exploded side elevational view of the spigot of FIG. 1.
Figure 4:
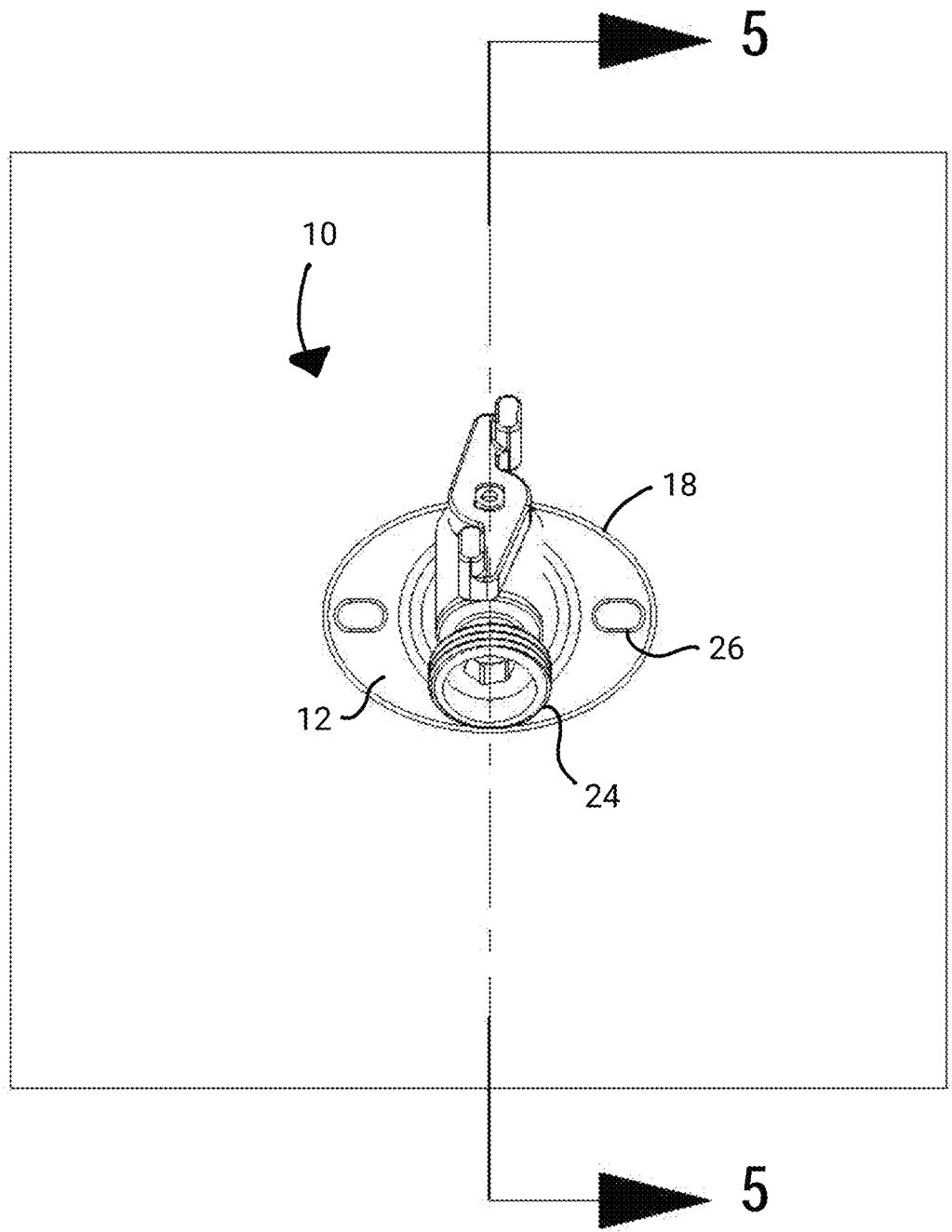
FIG. 4 is a first end elevational view of the spigot of FIG. 1.
Figure 5:
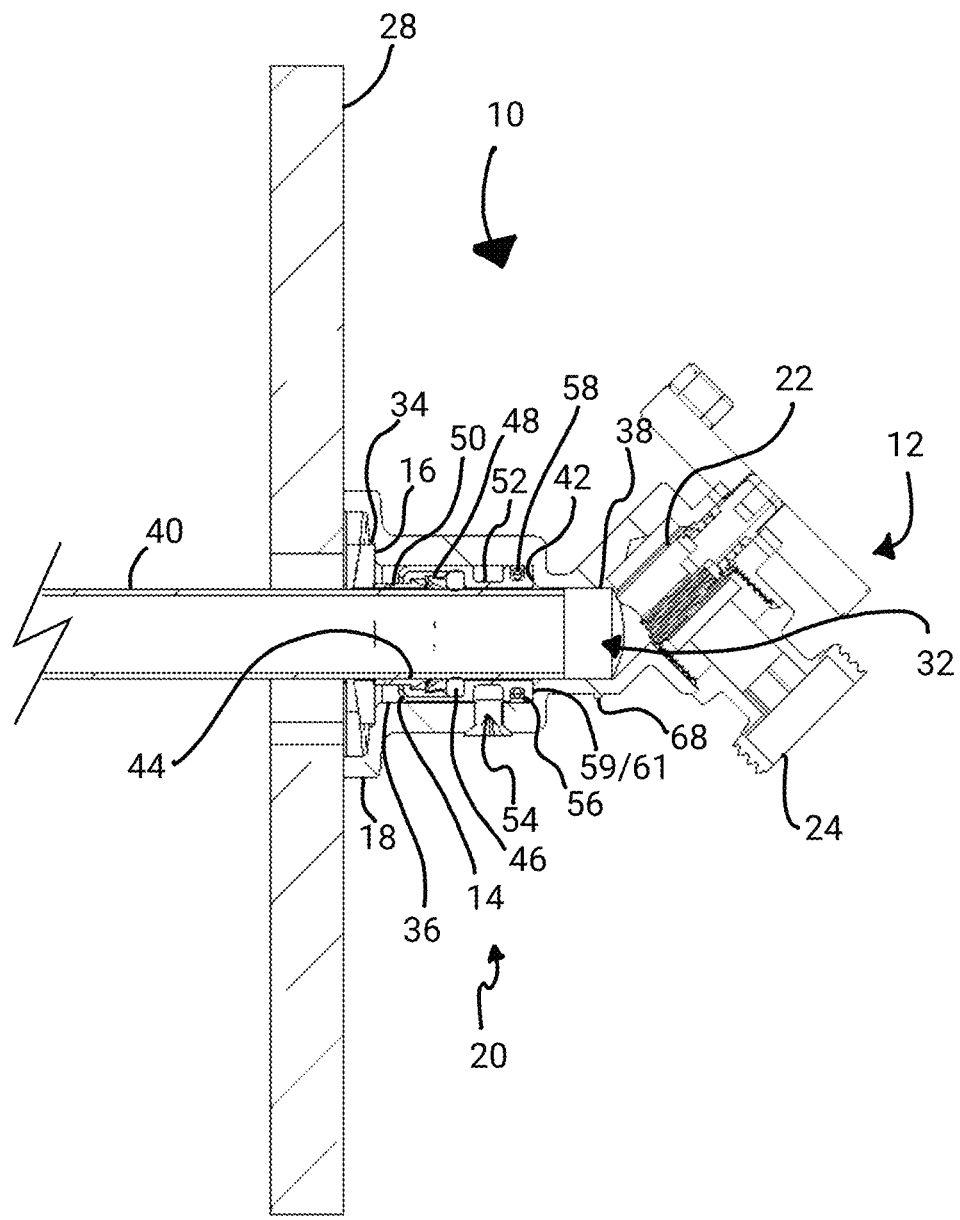
FIG. 5 is cross-sectional side elevational view of the spigot of FIG. 4 taken along the line 5-5.
Figure 6:
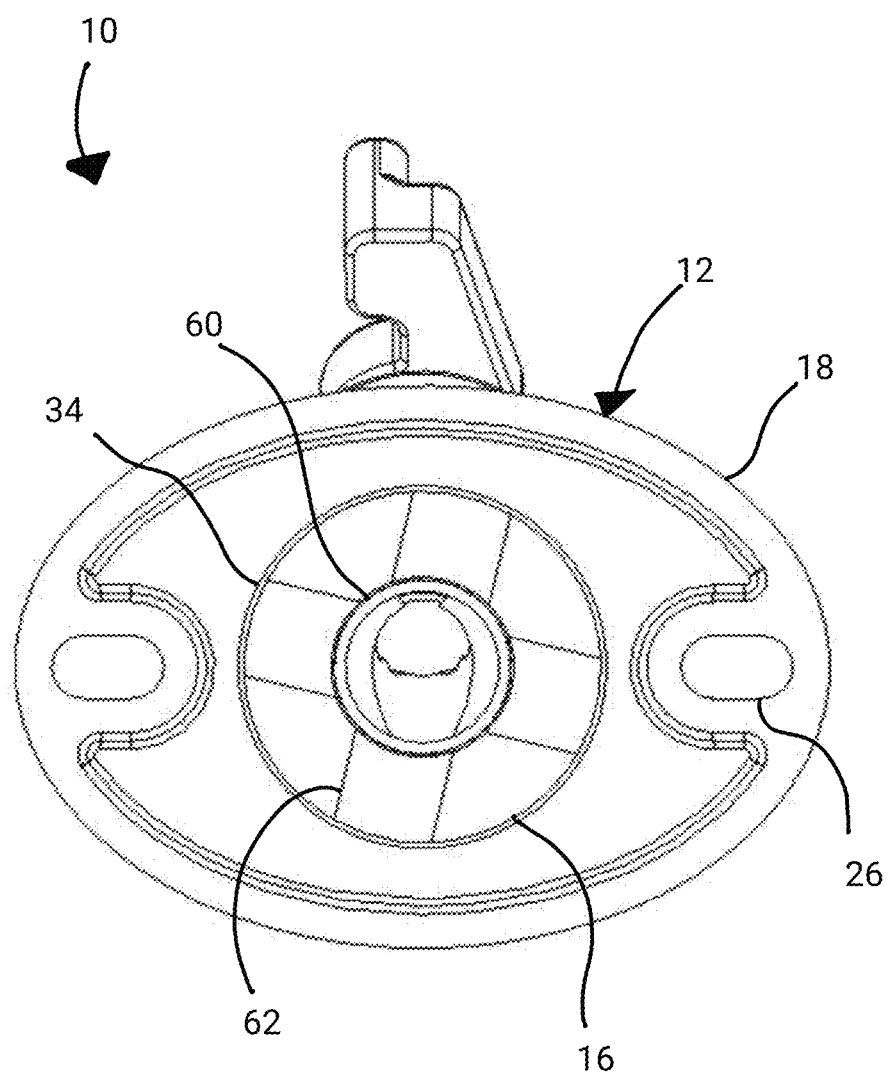
FIG. 6 is a second end elevational view of the spigot of FIG. 1.

As depicted in FIGS. 2 and 6, the removal plate 16 includes a plurality of radially aligned depressions, grooves, or slots 62 on a surface thereof. The slots 62 are open to an outer edge of the removal plate 16 and are preferably sized to receive an end of an elongate tool such as a flat-head screwdriver or similar tool. The slots 62 may extend from the outer edge of the removal plate 16 to the aperture 60 or may only extend part way from the outer edge toward the aperture 60. The slots 62 are preferably provided on only one axial surface of the removal plate 16 but may be provided on both axial surfaces thereof. In one embodiment, the removal plate 16 does not include the slots 62.

Figure 7:
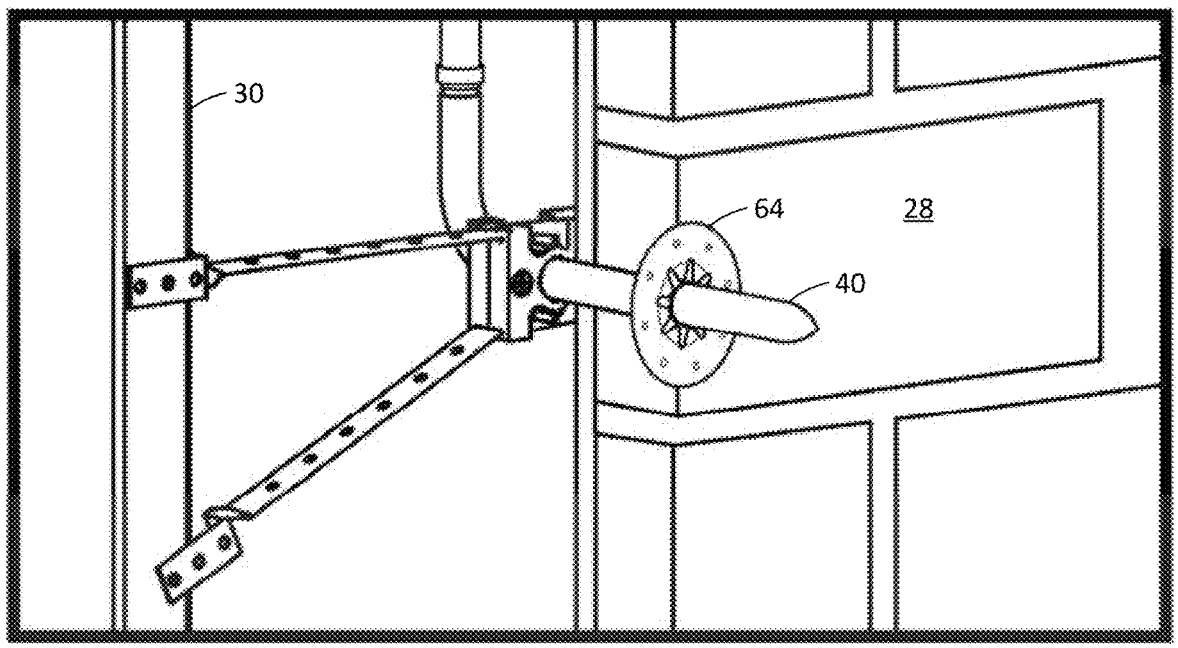
FIG. 7 is an illustrative view of a structure with a portion of a wall cladding removed to show interior components and with a stub-out installed therein in preparation for installation of the spigot of FIG. 1.
Figure 8:
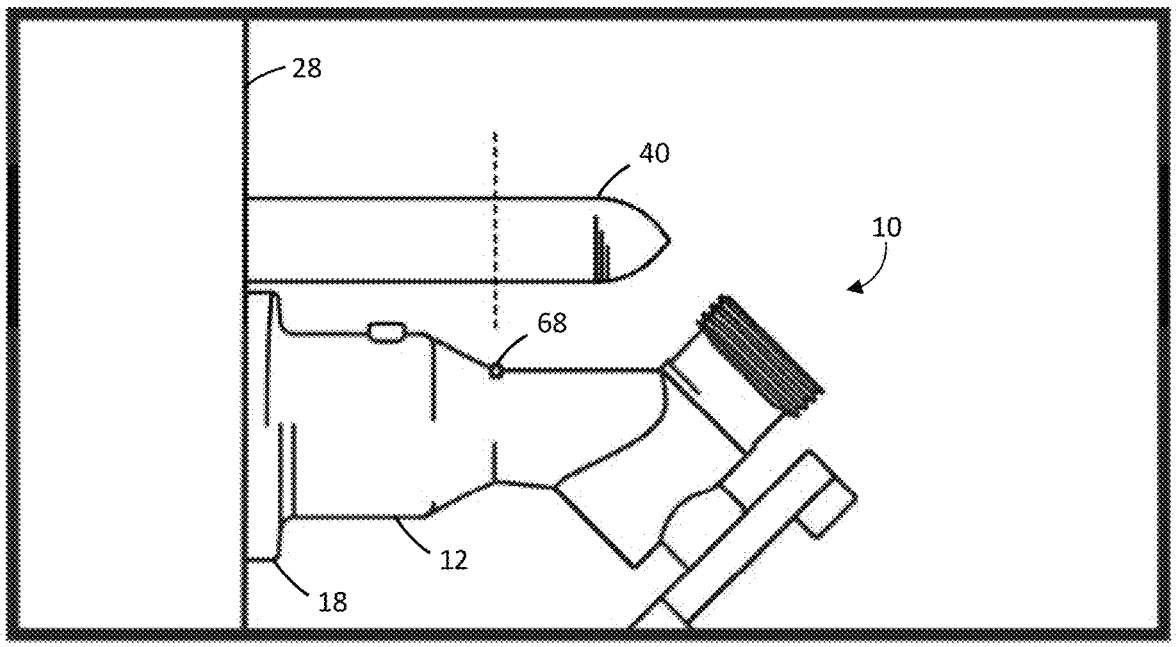
FIG. 8 is an illustrative view of a stub-out and a spigot valve body depicting a method for determining a proper length of the stub-out for installation of the spigot in accordance with an exemplary embodiment.
Figure 9:
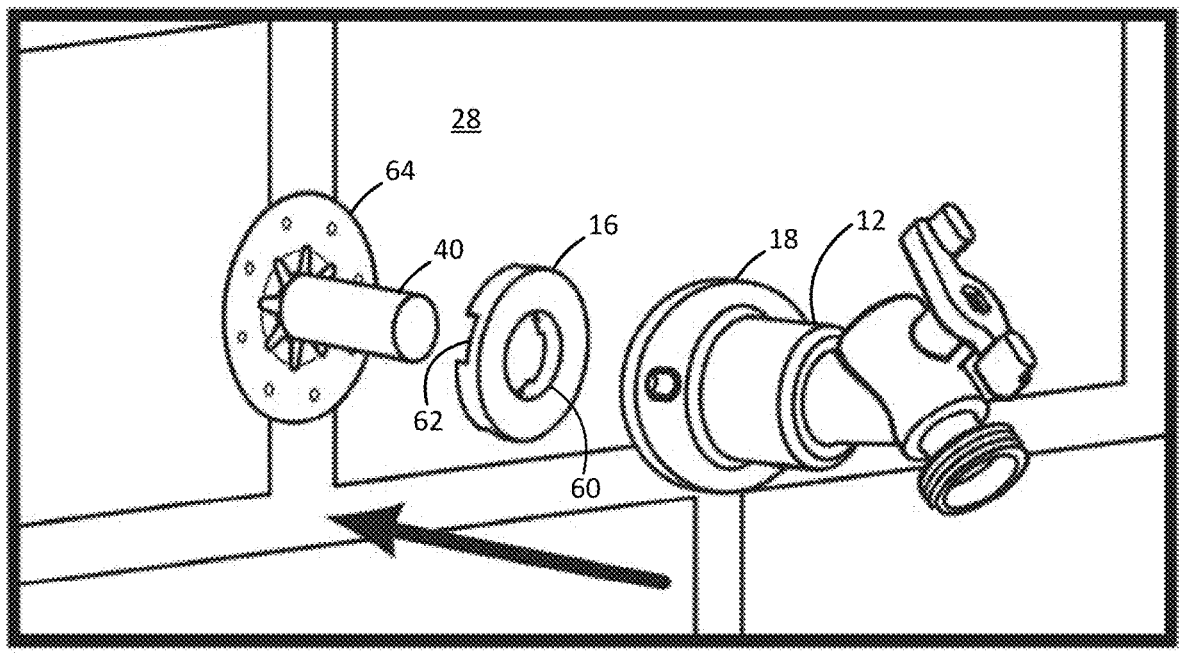
FIG. 9 is an illustrative view depicting installation of the spigot of FIG. 1 on the prepared stub-out of FIG. 8 in accordance with an exemplary embodiment.

With additional reference now to FIGS. 7-9, installation of the spigot 10 is described in accordance with an exemplary embodiment. Initially, the stub-out 40 is installed and secured in the wall 28 by means known in the art. Such installation may include installation of a star plate 64 to resist movement of the stub-out 40 into the wall 28 during installation of the spigot 10, but such is not required. The stub-out 40 may comprise dedicated fixture or component designed for use as a stub-out that may include a closed-off, spun-down, or blunted end as depicted in FIG. 7 and as commonly found in the art for copper stub-outs, or the stub-out may comprise an open-ended section of pipe or tubing extending from the wall 28. The stub-out 40 may be formed from any desired material including, for example, copper alloys, PEX (cross-linked polyethylene) materials, PVC (polyvinyl chloride) materials, or CPVC (chlorinated polyvinyl chloride) materials, among other tubing and piping forms available in the art.

As depicted in FIG. 8, the valve body 12 of the spigot 10 may include an indicator 68 formed on an exterior surface thereof that aids determination of a cut location or length of the stub-out desired for proper installation. To determine the desired length of the stub-out 40, the mounting flange 18 of the valve body 12 is placed against the wall 28 and the stub-out 40 marked and cut at a location that aligns with the indicator 68, as depicted in FIG. 8. The cut stub-out 40 may be deburred or otherwise prepared prior to installation of the spigot 10 using methods known in the art.

The removal plate 16 is installed on the stub-out 40 with the slots 62 facing or directed toward the wall 28. The removal plate 16 is slidably moved along the stub-out 40 to abut the wall 28 surface. The valve body 12 is preferably provided with the coupling member 14 pre-installed therein, however if not, the coupling member 14 is inserted into the internal passage 32 to place the abutment face 61 on the second end 59 thereof into abutting contact or adjacent to the shoulder 42. In one embodiment, an O-ring, sealing washer, or a sealant is installed against the shoulder 42 prior to insertion of the coupling member 14 into the internal passage 32.

The fastener 54 is then installed in a fastener aperture 66 in the inlet portion 20 of the valve body 12. The fastener 54 extends through the wall of the inlet portion 20 and into the internal passage 32 to engage the annular trough 52 in the coupling member 14. In other embodiments, a clip, latch, pin, or other similar component may be installed in the fastener aperture 66 to engage the trough 52. For example, in one embodiment the fastener aperture 66 is configured as a transverse slot and the fastener 54 comprises a C-shaped spring clip, one arm of which engages the annular trough 52 through the slot while the opposite arm extends around an opposite side of the exterior of the body 12. In another embodiment, the fastener 54 may comprise a spring-biased pin that extends through the fastener aperture 66 and that may be manually retracted to disengage from the trough 52 or may comprise another similar component that is coupled to the body 12 and moveable into engagement with the trough 52.

Interaction between the fastener 54 and the trough 52 resists axial movement, e.g. withdrawal, of the coupling member 14 from the internal passage 32. In one embodiment, configuration of the fastener 54 and the annular trough 52 are configured to apply an axial force on the coupling member 14 toward abutment with the shoulder 42 to aid formation of a seal between the shoulder 42 and the abutment face 61.

The valve body 12, with the coupling member 14 installed therein, is installed on the stub-out 40 by inserting the distal end of the stub-out 40 into the bore 44 of the coupling member 14. The stub-out 40 extends through the bore 44 a sufficient distance to engage the O-ring 46 or other sealing elements inside the coupling member 14 and the grip ring 48. The stub-out 40 may extend entirely through the bore 44 beyond the second end 59 of the coupling member 14 and into the neck portion 38 of the valve body 12. A liquid-tight seal is formed between the stub-out 40 and the spigot 10 without use of tools or other equipment and without need for excess length of the stub-out 40 extending from the wall 28.

Coupling of the spigot 10 with the stub-out 40 places the spigot 10 in the final desired installation position with the mounting flange 18 against the surface of the wall 28. With proper installation, no need should exist to force excess length of the stub-out 40 into the wall 28 as is common in current methods used in the art. Fasteners 27 are next installed through the apertures 26 in the mounting flange 18 to fixedly couple the spigot 10 to the wall 28.

Figure 10:
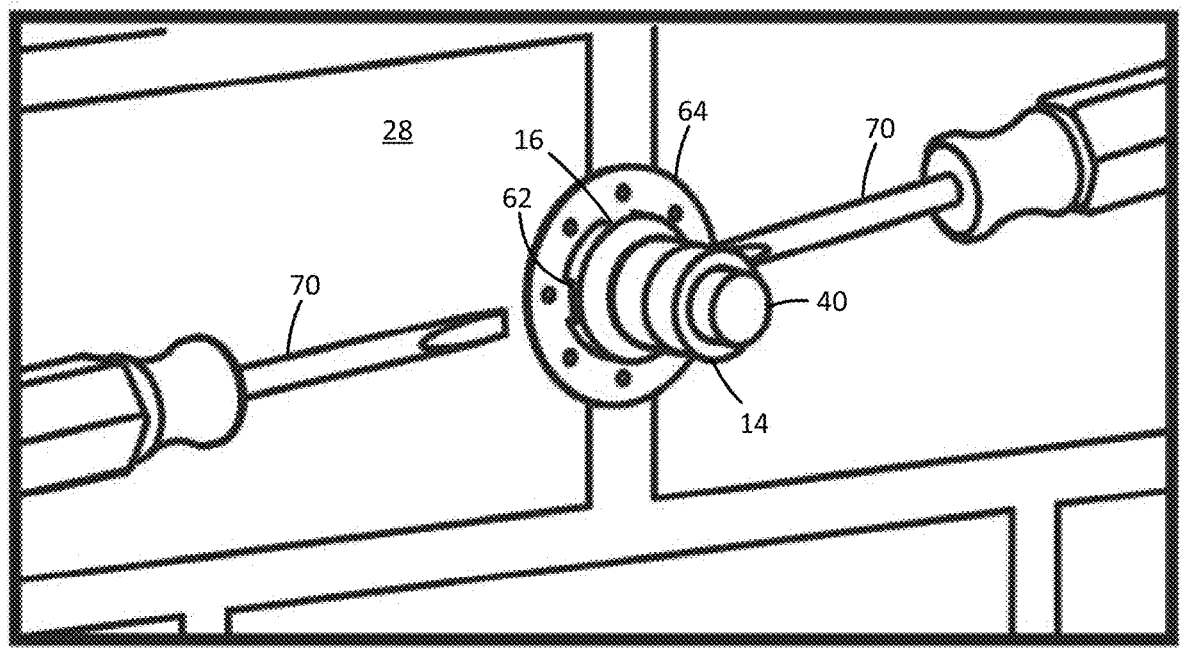
FIG. 10 is an illustrative view depicting removal of a coupling member and a removal plate from the stub-out of FIG. 8, a valve body of the spigot having been previously removed in accordance with an exemplary embodiment.

With reference now to FIGS. 9-10, removal of the spigot 10 from an installation is described in accordance with an exemplary embodiment. The fasteners 27 coupling the mounting flange 18 to the wall 28 are removed. The fastener 54 is removed from the valve body 12. The valve body 12 is pulled away from the wall 28 which withdraws the coupling member 14 from the internal passage 32 of the inlet portion 20. As shown in FIG. 10, the coupling member 14 and the removal plate 16 remain on the stub-out 40 with the removal plate 16 disposed between the first end 51 of the coupling member 14 and the wall 28.

The valve body 12 may now be replaced with a new or different valve body 12 or re-installed on the stub-out 40 by inserting the stub-out 40 and coupling member 14 into the inlet passage 32 of the new valve body 12. The fastener 54 is installed in the valve body 12 and the mounting flange of the valve 10 fastened to the wall 28 with fasteners 27 as described previously above.

To fully remove the spigot 10 from the installation, one or more tools 70 are inserted between the removal plate 16 and the wall 28 preferably by insertion into one or more of the slots 62. The tools may comprise, for example, a flat-head screwdriver or similar flat or wedged utensil that is sized to engage the slots 62. The tools 70 are pivoted or otherwise pulled or moved outwardly away from the wall 28 to move the removal plate 16 axially along the stub-out 40 away from the wall 28 and toward the coupling member 14. In one embodiment, the removal plate 16 may be grasped by hand and pulled away from the wall 28 without the use of the tools 70.

Axial movement of the removal plate 16 depresses the release collar 50 into the bore 44 of the coupling member 14 and disengages the grip-ring 48 from the stub-out 40. The coupling member 14 is thus moveable axially along the stub-out 40 away from the wall 28 and off of the stub-out 40. The removal plate 16 may also be removed from the stub-out 40 leaving the stub-out 40 ready for installation or re-installation of a new spigot 10 or other device or for other construction activities.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A push-fit spigot installation comprising:
a valve body that includes a mounting flange, an inlet portion, a valve, and an outlet, the inlet portion providing a passageway that extends into the valve body from the mounting flange and is open to the valve;
a coupling member slidably and axially disposed within the inlet portion of the valve body and removably retained therein against axial movement, the coupling member including a bore configured to receive a distal end of a stub-out on a structure and to removably engage the stub-out, the coupling member including a release collar extending from a first end of the bore and that is moveable axially within the bore to disengage the coupling member from the stub-out, the coupling member providing a liquid-tight engagement with the stub-out and with an inner wall of the inlet portion of the valve body;
a removal plate that includes an aperture sized to receive the stub-out therethrough and that is disposable on the stub-out between the structure and the coupling member, the removal plate being axially moveable along the stub-out to depress the release collar of the coupling member to disengage the coupling member from the stub-out.

2. The push-fit spigot installation of claim 1, further comprising:
a fastener installed through a wall of the valve body and into contact with the coupling member to removably retain the coupling member in the valve body.

3. The push-fit spigot installation of claim 2, further comprising:
an annular trough formed in an exterior wall of the coupling member and configured to receive the fastener.

4. The push-fit spigot installation of claim 1, wherein the removal plate includes a radial slot extending at least part way from an outer perimeter of the removal plate toward the aperture.

5. The push-fit spigot installation of claim 1, further comprising:
an annular channel formed in an exterior surface of the coupling member; and
a sealing member disposed in the annular channel and forming a liquid-tight seal between the coupling member and an interior surface of the valve body.

6. The push-fit spigot installation of claim 1, wherein the inlet portion of the valve body includes a receiver portion and a neck portion, the receiver portion having a first interior dimension and the neck portion having a second interior dimension that is smaller than the first interior dimension and that forms a shoulder on an interior surface of the inlet portion, the coupling member being disposed within the receiver portion and abutted against the shoulder.

7. The push-fit spigot installation of claim 1, wherein the stub-out comprises a pipe or tube formed from one of a copper alloy, a PEX (cross-linked polyethylene) material, a PVC (polyvinyl chloride) material, or CPVC (chlorinated polyvinyl chloride) material.

8. The push-fit spigot installation of claim 6, wherein the second interior dimension of the neck portion is sized to receive at least a portion of the stub-out therein.

9. The push-fit spigot installation of claim 1, wherein the passageway extends through the mounting flange and includes an interior radial dimension within the mounting flange that is sufficient to receive the removal plate.

10. The push-fit spigot installation of claim 1, wherein the coupling member comprises a push-fit fitting.

11. A method for installing a spigot, the method comprising:
disposing a removal plate on a stub-out extending from a structure, the removal plate including an aperture sized to receive the stub-out and being slidably axially moveable along the stub-out;
providing a valve body that includes a mounting flange, an inlet portion, a valve, an outlet, and a passageway extending through the valve body;
slidably axially inserting a coupling member into the passageway through the mounting flange and into the inlet portion, the coupling member including a bore configured to receive a distal end of the stub-out and to removably engage the stub-out, the coupling member including a release collar extending from a first end of the bore and that is moveable axially within the bore by the removal plate to disengage the coupling member from the stub-out, the coupling member providing a liquid-tight engagement with the stub-out and with an inner wall of the valve body;
inserting a fastener through a sidewall of the inlet portion and into engagement with an exterior surface of the coupling member to restrict the coupling member against axial movement within the passageway;
inserting an end of the stub-out into the bore of the coupling member;
engaging a push-fit connection between the stub-out and the coupling member; and
fastening the mounting flange of the spigot to the structure.

12. The method of claim 11, wherein the coupling member includes an annular trough formed in the exterior surface thereof that receives the fastener.

13. The method of claim 11, wherein the coupling member includes a sealing member disposed on the exterior surface thereof that provides a liquid tight seal between the exterior surface of the coupling member and an interior surface of the passageway.

14. The method of claim 11, wherein the removal plate includes a radial slot in an axial surface thereof and extending at least part way from an outer perimeter of the removal plate toward the aperture, and wherein disposing the removal plate on the stub-out further comprises:
orienting the removal plate to direct the axial surface with the radial slot toward the structure.

15. The method of claim 11, wherein the passageway includes a receiver portion and a neck portion, the receiver portion having a first interior dimension and the neck portion having a second interior dimension that is smaller than the first interior dimension and that forms a shoulder on an interior surface of the passageway.

16. A method for removing a spigot from an installation on a structure, the method comprising:
removing a retaining fastener from a body of the spigot, the retaining fastener being disposed to extend through a wall of an inlet portion of the spigot to engage a coupling member that is installed within a passageway therein, the fastener resisting axial movement of the coupling member within the passageway;
withdrawing the body of the spigot away from the structure to reveal the coupling member and a removal plate, the coupling member being engaged with a stub-out extending from the structure and the removal plate being disposed on the stub-out between the coupling member and the structure;

moving the removal plate axially along the stub-out toward the coupling member to depress a release collar into the coupling member and release a push-fit coupling between the coupling member and the stub-out; and sliding the coupling member axially along the stub-out and off a distal end of the stub-out.

17. The method of claim 16, wherein the coupling member includes an annular trough formed in the exterior surface thereof that engages the retaining fastener.

18. The method of claim 16, wherein the coupling member includes a sealing member disposed on the exterior surface thereof that provides a liquid tight seal between the exterior surface of the coupling member and an interior surface of the passageway.

19. The method of claim 16, wherein the removal plate includes a radial slot in an axial surface thereof and extending at least part way from an outer perimeter of the removal plate toward the aperture, and wherein moving the removal plate axially along the stub-out toward the coupling member further comprises:

inserting a tool into the slot and moving the tool in an axial direction along the stub-out to move the removal plate.

20. The method of claim 16, further comprising:

removing a fastener from an aperture in a mounting plate of the body of the spigot, the fastener coupling the mounting plate to a structure from which the stub-out extends.

* * * * *